TEST FIXTURE FOR PRINTED CIRCUIT BOARDS HAVING CAM CONTROLLED SEQUENTIAL OPERATORS

Filed March 6, 1964 5 Sheets-Sheet 1

INVENTORS
P.W.FREUND
H.C.TROTMAN
BY A. J. Nugent
ATTORNEY

Oct. 17, 1967 P. W. FREUND ETAL 3,348,146

TEST FIXTURE FOR PRINTED CIRCUIT BOARDS HAVING CAM CONTROLLED SEQUENTIAL OPERATORS

Filed March 6, 1964 5 Sheets-Sheet 2

United States Patent Office 3,348,146
Patented Oct. 17, 1967

3,348,146
TEST FIXTURE FOR PRINTED CIRCUIT BOARDS HAVING CAM CONTROLLED SEQUENTIAL OPERATORS

Paul W. Freund, Irvington, and Harold C. Trotman, Westfield, N.J., assignors to Western Electric Company, Incorporated, New York, N.Y., a corporation of New York Filed Mar. 6, 1964, Ser. No. 349,995
8 Claims. (Cl. 324—158)

This invention relates to the testing of printed circuit board units, and more particularly to apparatus for facilitating the rapid electric testing of printed circuit boards.

The fabrication of printed circuit boards on a mass production basis has created a requirement for testing apparatus capable of accurately and rapidly making electrical tests of the board circuit paths after the boards leave the assembly line.

While the electrical portion of the test apparatus is capable of operation at a very high rate compact simplified mechanical means to position and hold the units for rapid testing have heretofore been lacking.

It is, therefore, an object of this invention to provide a device which is operable to bring the circuit paths of printed circuit board units rapidly into precise engagement with contacts of an electrical testing circuit.

It is another object of the invention to provide a small, compact structure which is operated by simple lever action, and can be used by unskilled labor.

It is a further object of this invention to provide apparatus wherein the use of two multi-test area panels enables a plurality of printed circuit board units to be tested in a time saving manner.

In its broader aspects, the invention comprises apparatus for testing the path continuity of printed circuit board units comprising means forming a test area, means located above the test area for gripping a board at peripheral portions thereof, a shaft having cams mounted thereon extending through the test area, and a vertically movable plate equipped with a plurality of contacts which is operable to be forced upwardly by the cams to make contact at predetermined points on the printed circuit board unit.

In accordance with these and other objects, one embodiment of the instant invention contemplates a box-like frame, shoulder means mounted at the top corner portions of the frame to form an easily defined rest for supporting a printed circuit board unit, a plurality of movable claw-type gripping means mounted in the frame and operable to firmly grip the unit, a slidable plate spaced below the shoulder means, the plate having a plurality of conductive contacts thereon, a shaft which includes a plurality of cams mounted in said frame, spaced below the slidable plate, and a lever attached to the shaft operable to, in sequence, actuate the gripping means to grip the unit, and then cause the cams to move the sliding plate upwardly so that the conductive contacts touch preselected circuit points on the board. This insures a rapid, accurate test in a simple two step operation. A board is dropped on the frame, where it rests on the shoulder means. Then the lever is thrown to first activate the claw-type gripping means to firmly hold the board and while the board is being held causing the conductive contacts to be raised into board touching position. This insures that all the contacts will touch the board at the same time.

In a second embodiment, the invention comprises a frame, two similar test panels vertically mounted in the frame, each test panel having a plurality of test areas in side by side alignment, the said test areas being defined by opposing vertically extending spaced wall members which support grooved elements for receiving and supporting circuit board units to be tested at opposite sides thereof, an adapter mounted in each test area to receive the terminal portion of the board in a spring-loaded fit, a movable plate having knife-edge type conductive contacts mounted below and slightly forward of each connector, a shaft, extending the width of each test panel, which includes cam means mounted at each test area, a lever attached to one end of the shaft, operable to, upon rotation thereof, cause the movable plates to be raised simultaneously by said cam means, thereby effecting contact between the conductive knife edges on the sliding plate and the terminal blocks on the printed circuit board units, and means to eject the units from the adapters and appropriate wiring from the test area to a test console where the tests are recorded.

These and other features, advantages and objects of the invention will be understood more fully upon a study of the following detailed description considered along with the accompanying drawings wherein.

Figure 1:
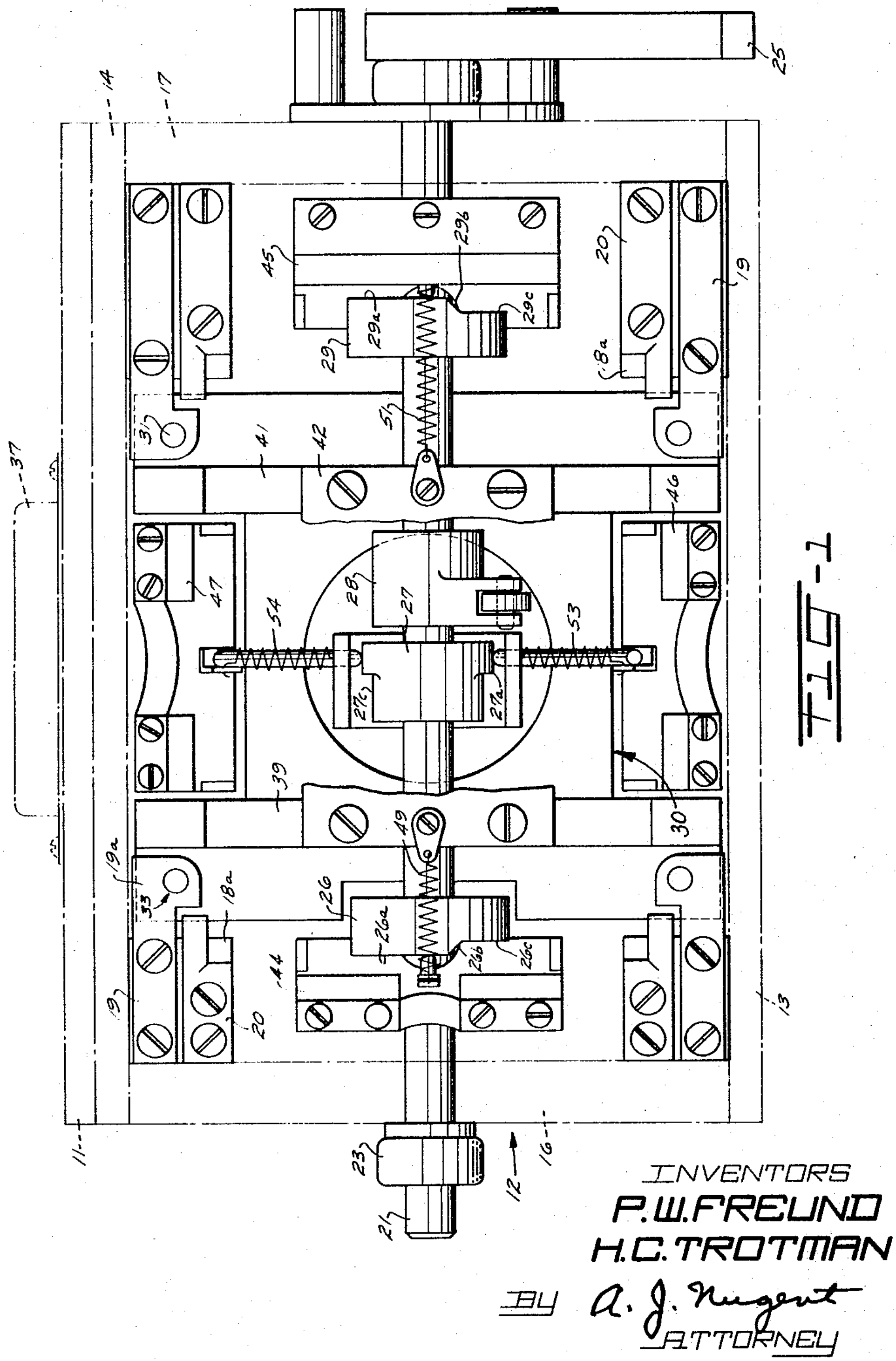
FIG. 1 is a top elevation of one embodiment of the invention.
Figure 2:
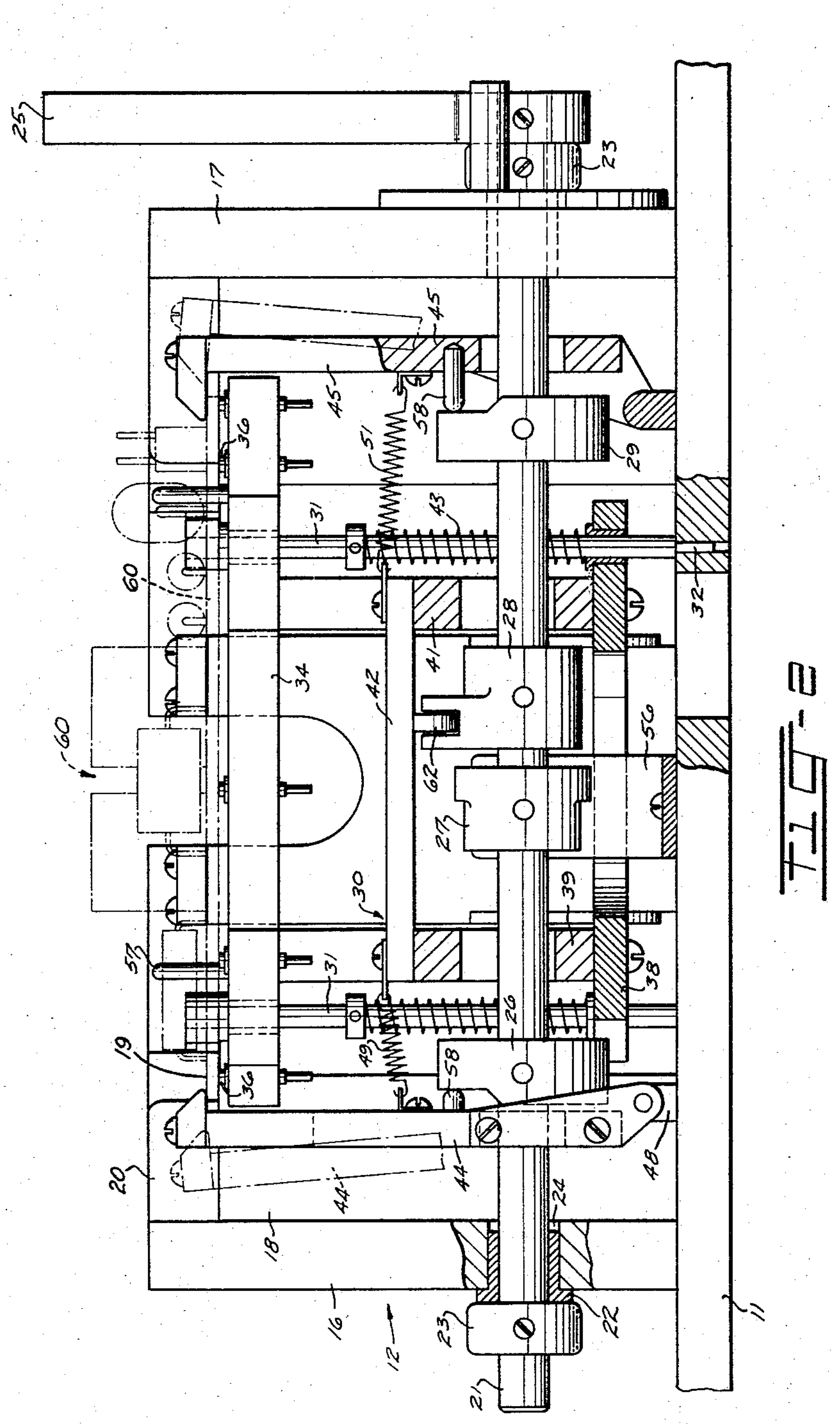
FIG. 2 is a side elevation section of the embodiment of FIG. 1 showing two of the gripping means both in opened and board gripping positions, and showing a printed circuit board unit in test position.
Figure 3:
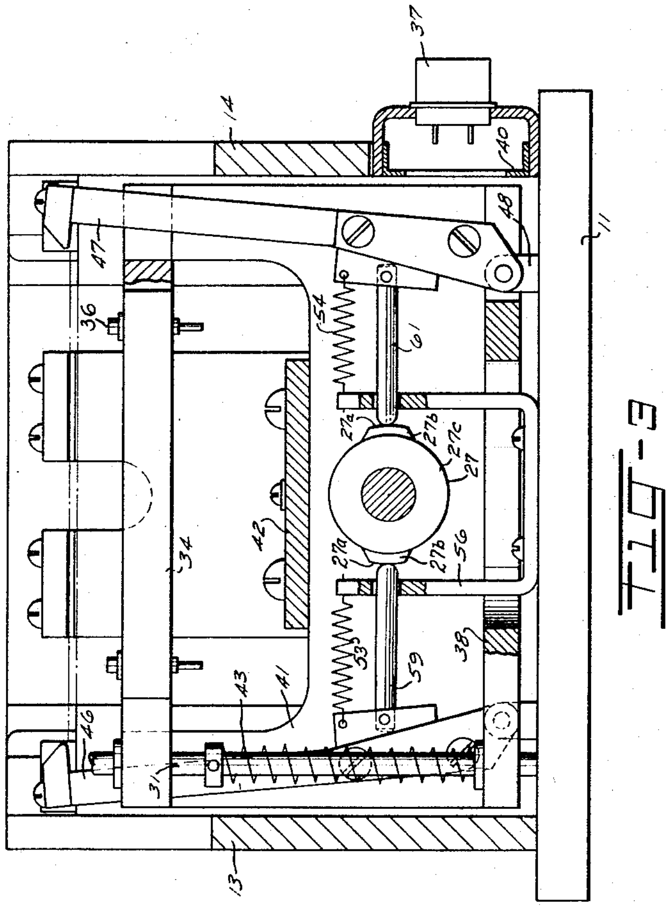
FIG. 3 is an end elevation section of the embodiment of FIG. 1 showing two other of the gripping means in open position.

With reference to FIGS. 1, 2 and 3 of the drawings the invention comprises a box-like frame 12 which includes a base member 11 and vertical side walls 13, 14, 16 and 17 reinforced at the corners by vertical members 18. A member 19 having a projecting portion **19*a* is mounted on the upper surface of each vertical member 18. A support member 20 having a vertical dimension substantially greater than member 19 is also mounted on vertical member 18. The innermost corner of each member 20 is cut away, thereby exposing a corner portion or supporting means 18*a* of member 18**.

A shaft 21 having a plurality of cam members 26, 27, 28 and 29 mounted thereon extends between the opposed side walls 16 and 17. The shaft is rotatably journaled in bearings 22 which are mounted in apertures 24 in said walls 16 and 17. Stops 23 are provided to lock the bearings within the apertures 24 and to prevent lateral movement of the shaft. The shaft also includes a lever 25 which is fixedly mounted on one end thereof. The operation of the aforementioned cams and lever will be discussed in detail below.

Mounted within frame 12 is a sliding plate assembly 30 which slides on four guide rods 31, which are mounted to the base 11 at their bottom ends (at 32) and to projecting portion **19*a* of member 19 (at 33) at their top ends. The sliding plate assembly 30 comprises a first or plunger plate 34 which includes a plurality of spring-loaded electrical contacts 36 located in predetermined positions for contacting the circuit paths of the circuit board unit being tested. The lead wires (not shown) connected to each contact 36 are gathered at connector 37, which in turn is connected to a test console (not shown). Attached to connector 37 is a wire guard 40 which holds the wires away from the moving parts of the apparatus. The sliding plate assembly 30 further comprises a second plate 38 slidably mounted on rods 31 in spaced relation to plate 34. The two slidable plates are connected together and maintained in the spaced relationship by U-shaped side supports 39 and 41 (see FIGS. 2 and 3). Mounted across the base of U-shaped members 39 and 41, and therefore intermediate to and in spaced relationship to plates 34 and 38, is a pressure plate 42. Springs 43 are provided to bias sliding plate assembly 30** in its lowest position.

Four movable claw-type gripping members 44, 45, 46 and 47 are provided to engage the periphery of a printed circuit board to firmly hold the printed circuit board corners against corner portions 18*a* of members 18 when the test is being conducted. Each gripping member is pivotably mounted on bracket 48 which is affixed to the base 11. FIG. 2 shows the side claws 44 and 45 in gripping position in solid lines and in disengaged position in phantom. The side claws 44 and 45 are biased in a closed gripping position by springs 49 and 51 respectively, the end of the springs being anchored to pressure plate 42. The front and rear claws 46 and 47 are biased in a closed position by springs 53 and 54. Bracket 56, bolted to base 11, provides the inner anchor for springs 53 and 54.

In operation, a printed circuit board unit 60 (in phantom, FIG. 2) to be tested is loaded into the test frame. Since members 20 are raised above the members 19 (FIG. 2), a board may be easily and rapidly loaded into the apparatus. The four corners of the board will be supported on the portions 18*a* of vertical reinforcing member 18 that are exposed by the cutaway portion of members 20. Guide pins 57 (FIG. 2), which are designed to engage predeterminately located holes in the board, are provided to further facilitate lining up the unit in a test position on the apparatus.

The lever 25 is rotated to drive shaft 21 in an actuating direction. The four cams 26, 27, 28 and 29 act to, in sequence, pivot the gripping members to their closed positions where they engage the periphery of the board to firmly press the circuit board corners against supporting means 18*a*, and then move the sliding plate assembly 30 upwards to make contact between the electrical contacts 36 and the predetermined circuit areas on the printed circuit board. This operation is accomplished in the following manner. The two cams 26 and 29 are operable, upon rotation of the shaft, to actuate gripping means 44 and 45. This is effectuated by the coaction of the biasing springs and pin members 58 (FIG. 2). The pins are affixed to the claw members 44 and 45 at one end thereof and rest against the cams 26 and 29 at their other end, thus opposing the biasing action of the springs. Rotation of the shaft will cause the pins to slide from cam surfaces 26*a* and 29*a* (FIG. 1) to cam surfaces 26*b* and 29*b* then to surfaces 26*c* and 29*c*. This will allow the biasing action of springs 49 and 51 to cause claws 44 and 45 to pivot and grip the board 60 against the supporting means 18*a* for testing. Simultaneously therewith, rotation of the cam 27 (FIGS. 1 and 3) will allow pins 59 and 61 to move under the action of springs 53 and 54 from surfaces 27*a*, 27*b* onto surface 27*c*, thus causing claws 46 and 47 to pivot and grip the board against the supporting means 18*a*.

Cam 28 acts to drive assembly 30 upwards by means of cam-roller 62. Upon further rotation of shaft 21, cam-roller 62 will contact and force pressure plate 42 upwardly (FIG. 2). The entire sliding plate assembly 30 moves upwardly, due to the mounting of the plates 34, 38 and 42 to the side support 41, thereby bringing conductive contacts 36 in contact with the predetermined points on the printed circuit board unit 60. Cam 28 is positioned on shaft 21 such that cam-roller means 62 is located angularly behind cam surfaces 26*b*, 27*b* and 29*b* in order that the latter surfaces will effect gripping by the claws 44–47 before the sliding plate assembly 30 rises to effect contact with the board by the contact 36.

Figure 4:
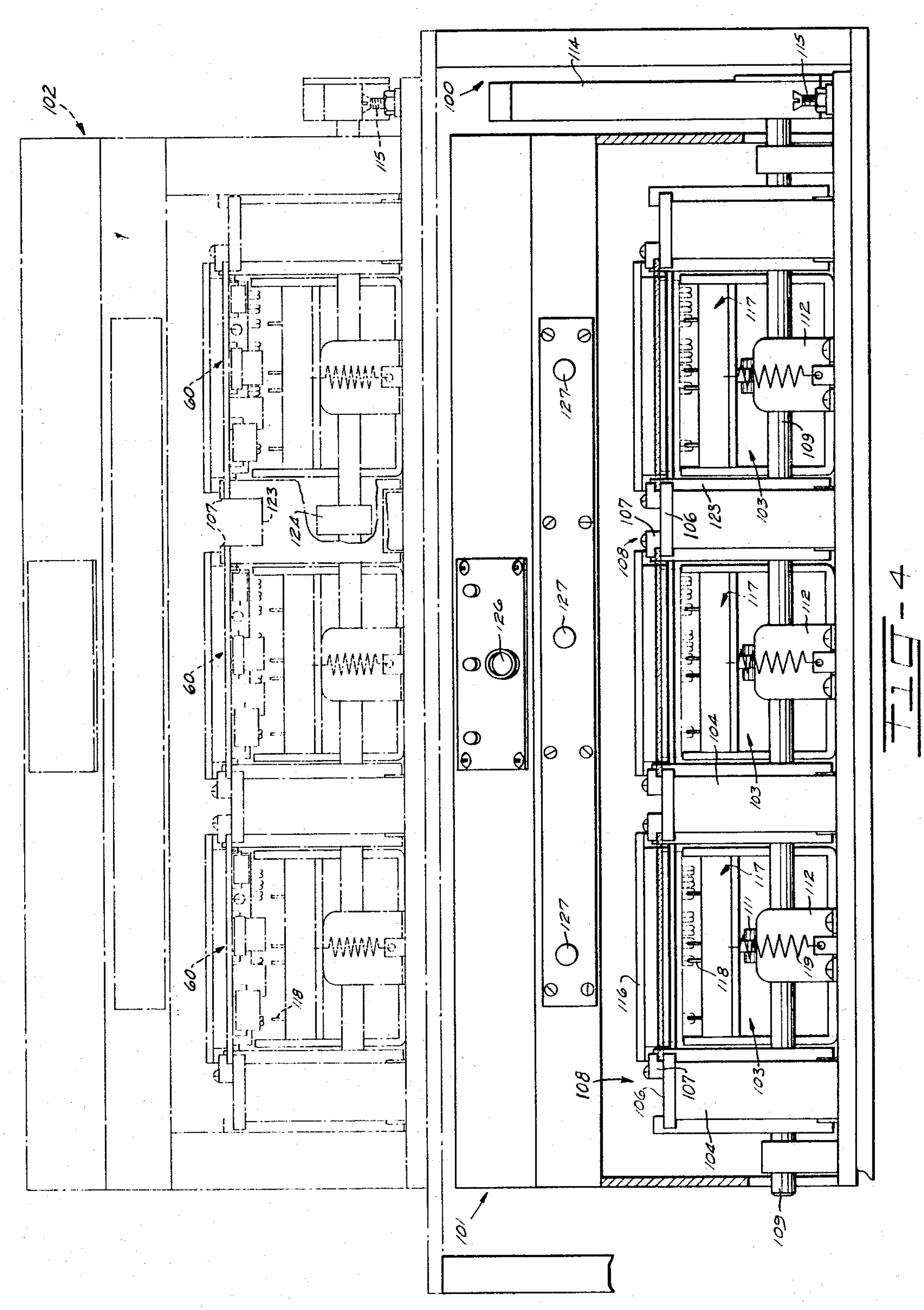
FIG. 4 is a front view of a second embodiment of the invention showing the bottom panel in test position and the top panel in load position after printed circuit boards have been inserted therein.
Figure 5:
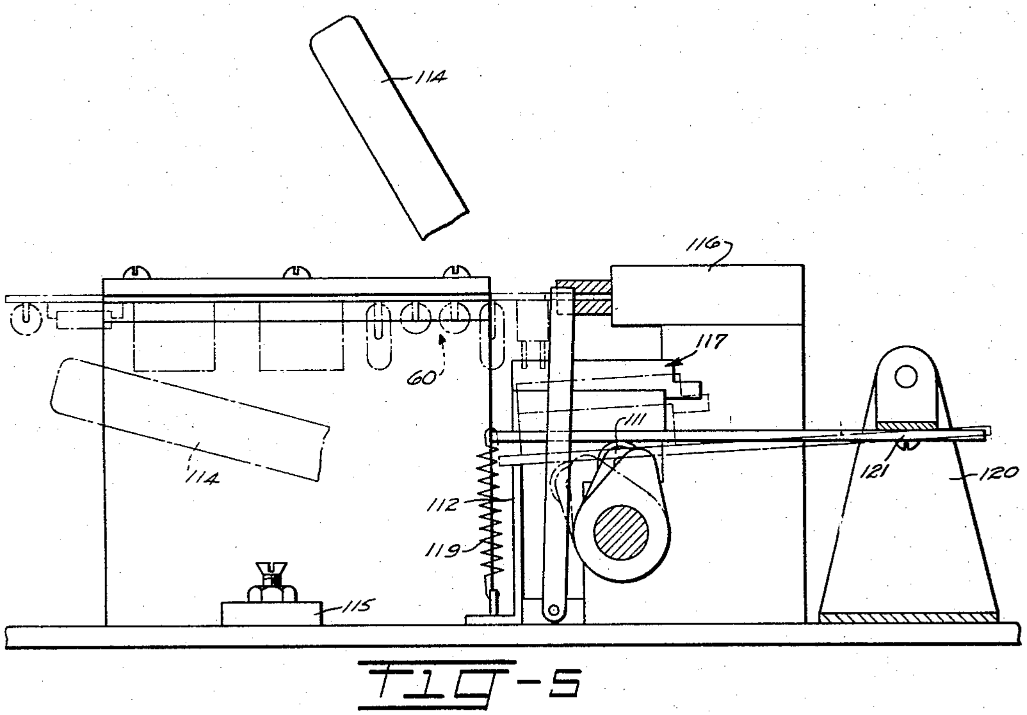
FIG. 5 is a side view, in section, of the embodiment of FIG. 4 showing the position of the lever and movable plate in both test position and load position.
Figure 6:
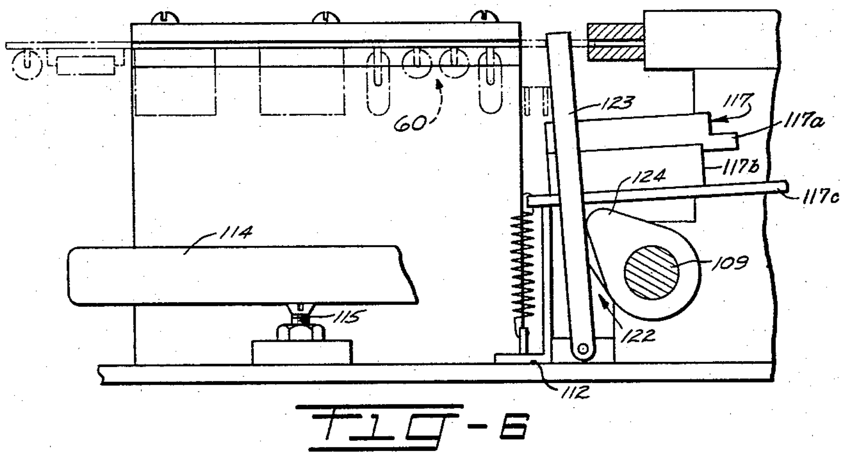
FIG. 6 is a side view, in section, of the embodiment of FIG. 4, showing the position of the lever and cams in unit ejecting position.

Referring now to the embodiment of FIGS. 4, 5 and 6, the invention comprises a frame 100 which supports two multi-test area panels 101 and 102 (three test areas per panel are shown, but of course there could be any number). Each test panel comprises a plurality of test areas 103, each test area being defined by opposing spaced wall members 104. A plate 106 is bolted to the top of each wall member 104, and members 107 are mounted thereto to form grooved gripping elements 108. A shaft 109 is mounted through the walls of each test panel and extends through the in-line test areas. The shaft 109 includes a roller type cam member 111 mounted thereon in each test area 103.

A stop member 112 is provided in each test area, mounted in front of cam 111. A lever 114 is fixedly mounted on one end of shaft 109 and is operable to rotate the shaft approximately 45° in one direction and 15° in the opposite direction from a neutral position. An adjustable stop member 115 is provided to halt the movement of the lever in a lower rest position (FIG. 6).

Mounted in the rear of each test area 103 is an adapter 116 which engages the terminal portion of the printed circuit board unit. A movable plate 117 comprising three contiguous segments 117*a*–117*c* is mounted in the rear of each test area, spaced between the adapter 116 and the shaft 109. The plate 117 includes a plurality of knife-edge type electrical contacts 118 mounted to the segment 117*a*. The plate 117 is normally biased in the position indicated in phantom in FIG. 5 by spring means 119, where the segment 117*c* rests as shown against the upper portion of stop 112. One end of the segment 117*c* is pivotally mounted to a bracket 120 at point 121 in order to permit the vertical movement of the plate 117.

In order to eject from the adapter 116 printed circuit board units which have been tested, the apparatus includes ejecting means 122. The means 122 comprises a U-shaped pivotable bar 123 mounted behind each wall member 104, bar 123 being wider than wall 104 to extend a predetermined distance into the adjacent test areas. Upon rotation of the lever to the lowermost position shown in FIG. 6, cams 124, mounted at predetermined intervals along shaft 109, will contact the bars 123 pivoting them into contact with the rear corner portions of the units under test and ejecting said units from adapters 116.

It a typical operation, three printed circuit board units 60 are placed as shown into one of the test panels (see panel 102) by sliding the boards into the opposing grooved gripping elements 108. The boards are pushed all the way back in the grooves until their terminal portions engage adapters 116 at the rear of the test area. Lever 114 is then rotated approximately 45°, causing cams 111 to force movable plates 117 upwardly until knife-edge contacts 118 make contact with the unit at predetermined locations thereof. Start button 126 is pushed to initiate the electrical test. If a unit should fail the test, the failure will be indicated on light 127. While the electrical test is being performed on the first group of units, which is a matter of seconds, an additional three units may be loaded in a like manner into the second panel, the lever thrown and the start button activated. By this time the test on the units in the first panel will be completed and lever 114 rotated downwardly to about 15° past its neutral position. This will force cams 124 to bear against bars 123, pivoting said bars towards the front of the apparatus to thereby force the units out of the adapters in order that they may be easily removed by hand. Three more units are then inserted, the lever thrown and the start button pushed in order to initiate another series of tests. The testing of the units of the second panel is completed by now, and they may be ejected from the apparatus. Three more units are loaded into the panel and the testing procedure continues in a like manner.

It is to be understood that the above two embodiments of the invention are merely illustrative thereof and the principles of the invention are applicable to many other arrangements that will fall within its spirit and scope.

What is claimed is:

1. A test fixture for generally rectangular printed circuit boards comprising:
 a base,
 means mounted on said base for forming a box-like test area,
 means mounted in the corners of the test area for supporting the corners of a printed circuit board to be tested,
 normally unactuated means mounted to said base opposite each face of the test area for engaging the periphery of said boards to hold said corners against said supporting means to grip said board to be tested,
 a rotatable shaft extending through the test area spaced below the supporting means and having a plurality of cams thereon, said cams actuating said engaging means upon rotation of said shaft,
 a plate mounted within said test area, spaced from said supporting means and slidable vertically by said cams from a first position to a second position spaced above said first position,
 a plurality of spring loaded electrical contacts mounted in predetermined positions on said slidable plate, and
 a lever affixed to said shaft and operable to, upon the rotation thereof through a first portion of a predetermined arc, cause at least one of said plurality of cams to actuate the engaging means to firmly hold said corners of a printed circuit board under test against said supporting means, and to, upon the rotation of the lever through the remaining portion of said predetermined arc, cause at least another of said plurality of cams to slide vertically the slidable plate from said first position, where said contacts are not touching the gripped printed circuit board, to said second position where they are.

2. A test fixture for generally rectangular printed circuit board units comprising:
 a base,
 walls mounted on said base forming a box-like test area,
 stationary means mounted to said walls at the upper corners of said test area for supporting the corners of a unit to be tested,
 means pivotally mounted opposite each face of the test area for engaging the periphery of said unit to grip said corners against said supporting means,
 resilient means connected to each of said engaging means for biasing said engaging means toward a corner-gripping position,
 a shaft having four cams thereon rotatably mounted to said walls and extending through the test area, said shaft being spaced from the supporting means, and three of said cams normally holding the gripping means away from said corner-gripping position against the force of the resilient means,
 four guide rods mounted to said base, and extending vertically to the top of the test area,
 a vertically slidable plate assembly mounted on said guide rods, the assembly including a plunger plate having a plurality of spring loaded electrical contacts thereon, a pressure plate contacting a fourth of said cams and spaced below said plunger plate and above said shaft, and a supporting plate spaced below said plunger plate and said shaft, and
 a lever affixed to one end of said shaft for rotating said shaft through a first portion of a predetermined arc to rotate said three of said cams to allow the engaging means to be pivoted by said resilient means to grip firmly the unit corners against the supporting means, and then through a second portion of said predetermined arc, for rotating the fourth of said cams to abut against the pressure plate and force the slidable plate assembly upwardly to a position where the electrical contacts touch the unit.

3. A test fixture for printed circuit board units comprising:
 a plurality of spaced vertically extending wall members defining therebetween a plurality of test areas,
 means affixed to the tops of said walls for engaging the periphery of units under test,
 a shaft mounted rotatably through the walls and extending through said plurality of test areas,
 a plurality of roller-cams on said shaft, predeterminately located thereon in order that there is at least one cam in each test area,
 a movable plate, spaced above said shaft, mounted in each test area, each movable plate both having a plurality of electrical contacts thereon and being vertically movable by one of said roller-cams upon rotation of said shaft,
 means co-acting with said engaging means for supporting units under test mounted in each test area spaced above said movable plate,
 normally unactuated means for ejecting units under test from said supporting means,
 means for rotating said shaft and operable to, upon the rotation thereof in one direction, cause said roller-cams to raise all of said movable plates simultaneously to a position where said electrical contacts are touching the engaged and supported units under test, and upon the rotation thereof in the opposite direction for actuating said ejection means to eject said units under test from said supporting and engaging means,
 means enclosing said plurality of test areas in a housing,
 a frame, upon which said housing means is mounted, and
 a second housing means, enclosing substantially the same testing means as the first mentioned housing means, mounted in said frame in a position vertically above said first mentioned housing means.

4. A test fixture for printed circuit board units comprising:
 a base,
 a plurality of spaced, vertically extending wall members fixed to said base and defining a plurality of test areas therebetween,
 means affixed to the top of said wall members forming grooves for gripping the periphery of units under test at the respective test areas,
 a rotatable shaft extending through said plurality of test areas and said wall members,
 a plurality of roller-cams on said shaft predeterminedly located thereon, so there is at least one cam in each test area,
 an adapter mounted in each test area, spaced above said shaft and formed so as to be able to receive and support the terminal portion of a unit gripped in said grooves,
 a plate mounted in each test area spaced between said shaft and said adapter, each plate including a plurality of electrical contacts on its upper surface, said plate being movable vertically from a first lowermost position to a second position spaced above said first position by rotation of one of said roller-cams,
 stop means in each test area for supporting the movable plates in said lowermost position,
 resilient means attached respectively to each of said movable plates for biasing said plates to said lowermost position, a pivotable horizontal member mounted to said base, said member including a series of vertically extending U-shaped bar members positioned behind each wall member and having a lateral dimension large enough to extend a predetermined distance into the adjacent test areas, said member being selectively pivotable to bring said lateral dimensions into engagement with units received and supported in said adapter, camming means mounted on said shaft opposite said arms for selectively pivoting said horizontal member upon rotation of said shaft, a lever means affixed to said shaft and operable to, upon rotation thereof through a predetermined arc in one direction, rotate the roller-cams to raise all of said movable plates simultaneously from said first lowermost position where said plate is supported on said stop means to said second position where the electrical contacts are touching the units under test, and to, upon rotation thereof through a predetermined arc, greater than said first mentioned predetermined arc, in said opposite direction, rotate said camming means to pivot said pivotable member to eject printed circuit board units under test from said adapters, means enclosing said plurality of test areas in a housing, a frame, upon which said housing means is mounted, and a second housing means, enclosing substantially the same testing means as the first mentioned housing means, mounted in said frame in a position vertically above said first mentioned housing means.

5. A test fixture for generally rectangular printed circuit boards having terminated circuit paths thereon comprising:

a frame, means rigidly mounted to said frame for supporting the corners of a board against downward movement, means for engaging the periphery of said board to clamp said corners down against said supporting means, a vertically movable plate positioned below said supporting means and said engaging means, said plate including a patterned array of electrical contacts for engaging predetermined terminations of said circuit paths, connector means for establishing electrical continuity between said contacts and an electrical testing means, means for moving said plate upwardly to engage said predetermined terminations with said contacts, said engaging means comprising a plurality of generally vertical members having claws at the tops thereof, said members being pivotally mounted to said frame to selectively engage the periphery of said board with said claws, said plate moving means further including means for sequentially pivoting said pivotal members and then moving upwardly said plate to first engage the periphery of said boards with said claws, to clamp said corners down against said supporting means and then to engage said terminations with said contacts, and said plate moving and member pivoting means includes a plurality of cams fixed to a shaft mounted rotatably on said frame, said cams both moving upwardly said plate and permitting pivoting of said members upon rotation of said shaft.

6. A test fixture as set forth in claim 5 wherein said plate moving and member pivoting means further includes:

first resilient means for normally maintaining said plate in a downward position, and second resilient means for biasing said pivotal members toward engagement of said board periphery by said claws.

7. A test fixture for generally rectangular printed circuit boards having terminated circuit paths thereon comprising:

a frame, means mounted to said frame for engaging a circuit board and supporting said board against downward movement, a vertically movable plate positioned below said engaging and supporting means, said plate including patterned array of electrical contacts for engaging predetermined terminations of said circuit path, connector means for establishing electrical continuity between said contacts and electrical testing means, means for moving said plate upwardly to engage said predetermined terminations with said electrical contacts, normally unoperated means for ejecting said boards from said engaging and supporting means, said ejecting means having an upwardly extending U-shaped member pivotally mounted to said frame and having arms engageable during operation thereof with an edge of said supported boards upon pivoting thereof to eject said boards, said plate moving and board ejecting means operating means includes a plurality of cams fixed to a shaft mounted rotatably on said frame, said cams both moving upwardly said plate and pivoting said U-shaped member upon rotation of said shaft.

8. A test fixture as set forth in claim 7 wherein said plate moving and board ejecting means operating means further comprises:

first resilient means for normally maintaining said plate in a downward position, and second resilient means for biasing said U-shaped member of said ejecting means in said normally unoperated state wherein said arms are out of engagement with said boards.

References Cited

UNITED STATES PATENTS

| | | | |
|---|---|---|---|
| 2,844,250 | 7/1958 | Bayha | 324—158 XR |
| 2,918,648 | 12/1959 | Ludman | 324—158 XR |
| 3,165,674 | 1/1965 | Swan | 324—158 XR |
| 3,185,927 | 5/1965 | Margulis | 324—158 |

RUDOLPH V. ROLINEC, *Primary Examiner.*

WALTER L. CARLSON, *Examiner.*

E. L. STOLARUN, *Assistant Examiner.*